US012394005B2

(12) United States Patent
Bowdon

(10) Patent No.: US 12,394,005 B2
(45) Date of Patent: Aug. 19, 2025

(54) AUTOMATED SYSTEM AND METHODS FOR COPIOUS ELECTRONIC ASSET TRANSFERS

(71) Applicant: VerityPay Intellectual Properties, LLC, Houston, TX (US)

(72) Inventor: Robert Bowdon, Houston, TX (US)

(73) Assignee: VerityPay Intellectual Properties, LLC, Houston, TX (US)

( * ) Notice: Subject to any disclaimer, the term of this patent is extended or adjusted under 35 U.S.C. 154(b) by 0 days.

(21) Appl. No.: 18/759,975

(22) Filed: Jun. 30, 2024

(65) Prior Publication Data

US 2024/0354881 A1   Oct. 24, 2024

Related U.S. Application Data

(63) Continuation-in-part of application No. 17/574,562, filed on Jan. 13, 2022, now abandoned, which is a
(Continued)

(51) Int. Cl.
*G06Q 50/18* (2012.01)
*G06Q 20/22* (2012.01)
*G06Q 20/40* (2012.01)

(52) U.S. Cl.
CPC ......... *G06Q 50/186* (2013.01); *G06Q 20/223* (2013.01); *G06Q 20/40* (2013.01)

(58) Field of Classification Search
None
See application file for complete search history.

(56) References Cited

U.S. PATENT DOCUMENTS 6,192,347 B1  2/2001  Graff
7,054,833 B1  5/2006  McDonald
(Continued)

FOREIGN PATENT DOCUMENTS

EP    3373235 A2 *  9/2018  ....... G06F 16/90335
JP    2021061064 A     4/2021

OTHER PUBLICATIONS

Gregory, T. J., "Unclaimed Property and Due Process: Justifying "Revenue-Raising" Modern Escheat", Michigan Law Review, vol. 110:319. (Year: 2012).*
(Continued)

*Primary Examiner* — Clay C Lee
(74) *Attorney, Agent, or Firm* — FisherBroyles, LLP; Jeremy P. Sanders

(57) ABSTRACT

A system and method are configured to receive owner data that identifies one or more property owners and property held by a third party that is owed to the one or more property owners. The system is configured to generate unique electronic communications to the one or more property owners, the electronic communication including an identification of the property, identification of the third party that is holding the property, a unique link for each of the one or more property owners, and instructions on how to receive the property. Individual property owners can verify their identity, such as by following a unique link provided in the electronic communication and providing secure identifying information. The system is further configured to initiate a transfer of the property from the third party holding the property to the property owners.

18 Claims, 12 Drawing Sheets

Related U.S. Application Data continuation-in-part of application No. 17/371,068, filed on Jul. 8, 2021, now abandoned, which is a continuation-in-part of application No. 17/339,697, filed on Jun. 4, 2021, now abandoned.

(56) References Cited

U.S. PATENT DOCUMENTS

| | | | |
|---|---|---|---|
| 8,639,592 | B1 | 1/2014 | Rouse et al. |
| 8,914,306 | B1* | 12/2014 | Preovolos ............... G07F 17/42 |
| | | | 705/41 |
| 2009/0030825 | A1 | 1/2009 | Nilson |
| 2011/0099103 | A1* | 4/2011 | Minnis ................... G06Q 99/00 |
| | | | 705/500 |
| 2013/0173367 | A1 | 7/2013 | Beighley, Jr. |
| 2014/0244464 | A1 | 8/2014 | Pinski |
| 2014/0280588 | A1* | 9/2014 | McPhee ................ H04L 51/214 |
| | | | 709/204 |
| 2014/0337059 | A1 | 11/2014 | Simon et al. |
| 2015/0066765 | A1* | 3/2015 | Banks .................. G06Q 20/023 |
| | | | 705/44 |
| 2017/0091887 | A1 | 3/2017 | Allinson et al. |
| 2019/0182342 | A1 | 6/2019 | Goenka et al. |
| 2019/0220839 | A1* | 7/2019 | Oliynyk ................. G06Q 20/10 |
| 2020/0349663 | A1 | 11/2020 | Quadros |
| 2021/0090191 | A1* | 3/2021 | Chan ....................... G16H 40/67 |
| 2021/0335462 | A1 | 10/2021 | Yantus |
| 2022/0114686 | A1 | 4/2022 | Yip et al. |

OTHER PUBLICATIONS

PCT/US2022/032387 International Search Report and Written Opinion dated Dec. 2, 2022.

\* cited by examiner

AUTOMATED SYSTEM AND METHODS FOR COPIOUS ELECTRONIC ASSET TRANSFERS

RELATED APPLICATIONS

This application is a continuation-in-part of, and claims the benefit of, U.S. application Ser. No. 17/574,562, filed on Jan. 13, 2022, which is a continuation-in-part of U.S. application Ser. No. 17/371,068 filed on Jul. 8, 2021, which is a continuation-in-part of Ser. No. 17/339,697 filed on Jun. 4, 2021 each of which are entitled AUTOMATED SYSTEM AND METHODS FOR ELECTRONIC ASSET RECOVERY, the disclosures of which are incorporated, in their entirety, by this reference.

BACKGROUND

Currently, there are over fifty million accounts escheated each year in the US alone. When assets, such as financial instruments, financial accounts, personal property, and real property go unclaimed for a period of time, the assets revert to the government, which is then free to spend, dispose of, or treat the assets as its own. However, many of the rightful owners of the assets are living and have a right to the assets, assuming they know about the assets before they escheat.

According to some statistics, over 80% of the escheated assets are owned by a living person who has a rightful claim to the assets. This volume of escheated assets appears to be growing by as much as 20% or more each year.

Typically, a rightful owner of an asset must proactively search the unclaimed property databases to look for unclaimed property that have been escheated. In some cases, there are individuals and companies who browse these unclaimed property databases and find the rightful owners and promise to help them recover their assets in exchange for a fee or a percentage of the asset value.

In some cases, a company who holds the property before escheatment has obligations to notify the asset owner about the existence of the asset. However, where the company does not receive a response, such as when a person moves or ignores a written letter, the company may not be able to take further action to notify the asset owner.

With the significant volume of accounts at risk of escheatment, searching and contacting the rightful asset owners is inefficient, and in many cases, untenable. It would be a significant advantage if the rightful asset owners could be contacted and the assets returned to them in a more efficient, even automated, way.

Through the following disclosure that includes systems and methods, these and other advantages will become apparent by reference to the following description and appended figures.

SUMMARY

According to some embodiments, a computer-implemented method, includes the steps of receiving dormant account data associated with one or more asset owners, the dormant account data including at least an identity of the one or more asset owners, their last known address, and an asset to be returned to individual ones of the one or more asset owners; determining a living status of the one or more asset owners; enriching, with updated contact information, an asset owner data record associated with each of the asset owners; generating a unique communication to the one or more asset owners, the unique communication including at least an identification of the asset and instructions on how to recover the asset; and electronically delivering the asset to the asset owner.

In some embodiments, the asset is a monetary asset and may include one or more of a payment, paycheck, a refund, securities, IRA account, safety deposit box contents, other personal property, or a deposit.

In some cases, the living status of the one or more asset owners is performed automatically by searching death records. Of course, other records may be searched to determine the living status, and may be inferred, for example, by recent payment transactions, updated employment information, and other such information that can be used to infer that an asset owner is living.

In some cases, the step of enriching the asset owner data record comprises updating the asset owner data record with one or more of current contact information, employment information, and financial information.

In some examples, the step of generating the unique communication comprises generating an electronic message. The electronic message may be an electronic mail message addressed to an e-mail address and/or a text message addressed to a cellular telephone number. In some cases, the electronic message includes asset information, which may include an amount of the asset and a dormant account holder identity of the asset.

In some instances, the step of electronically delivering the asset to the asset owner comprises a funds transfer through a peer-to-peer payment service.

According to some embodiments, a system includes one or more processors; and one or more computer-readable storage media comprising instructions that, when executed on the one or more processors, configure the system to at least: receive dormant account data associated with an asset owner; generate updated account data associated with the asset owner; enrich dormant account data with updated account data to create enriched asset owner data; generate, based at least in part on the enriched asset owner data, a unique communication to the asset owner; and initiate an electronic payment to the asset owner.

In some cases, the unique communication to the asset owner includes an asset owner name, and one or more of dormant account data, asset amount, a dormant account date, and a link for the asset owner to receive the asset. The dormant account data may identify the dormant account holder, a time during which the asset owner had an account with the dormant account holder or worked for the dormant account holder.

In some examples, the instructions further cause the processors to configure the system to verify an identity of the asset owner prior to initiating the electronic payment to the asset owner.

The instructions may further cause the one or more processors to configure the system to verify a living status of the asset owner.

The instructions may further cause the one or more processors to configure the system to receive a selection from the asset owner of a desired payment platform for receiving the asset. The payment platform may be a peer-to-peer payment platform.

In some cases, the communication is sent to a computing device associated with the asset owner. The computing device may be any type of computing devices, such as a smartphone, a cellular telephone, a laptop computer, a desktop computer, a tablet computer, a smart watch, or a smart vehicle.

In some examples, the instructions further cause the processors to configure the system to generate a hyperlink specific to the asset owner. The hyperlink may allow the asset owner to claim the asset, and may further provide a method for the asset owner to verify his or her identity, and select a payment platform for receiving the asset.

The instructions may further cause the one or more processors to configure the system to generate, at a future date, enriched asset owner data as new asset owner data becomes available. In other words, where the asset owner cannot be located, the system may be configured to periodically search for updated contact information and then enrich the asset owner data and generate a communication when updated information becomes available.

BRIEF DESCRIPTION OF THE DRAWINGS

A better understanding of the features, advantages and principles of the present disclosure will be obtained by reference to the following detailed description that sets forth illustrative embodiments, and the accompanying drawings of which.

DETAILED DESCRIPTION

Figure 1:
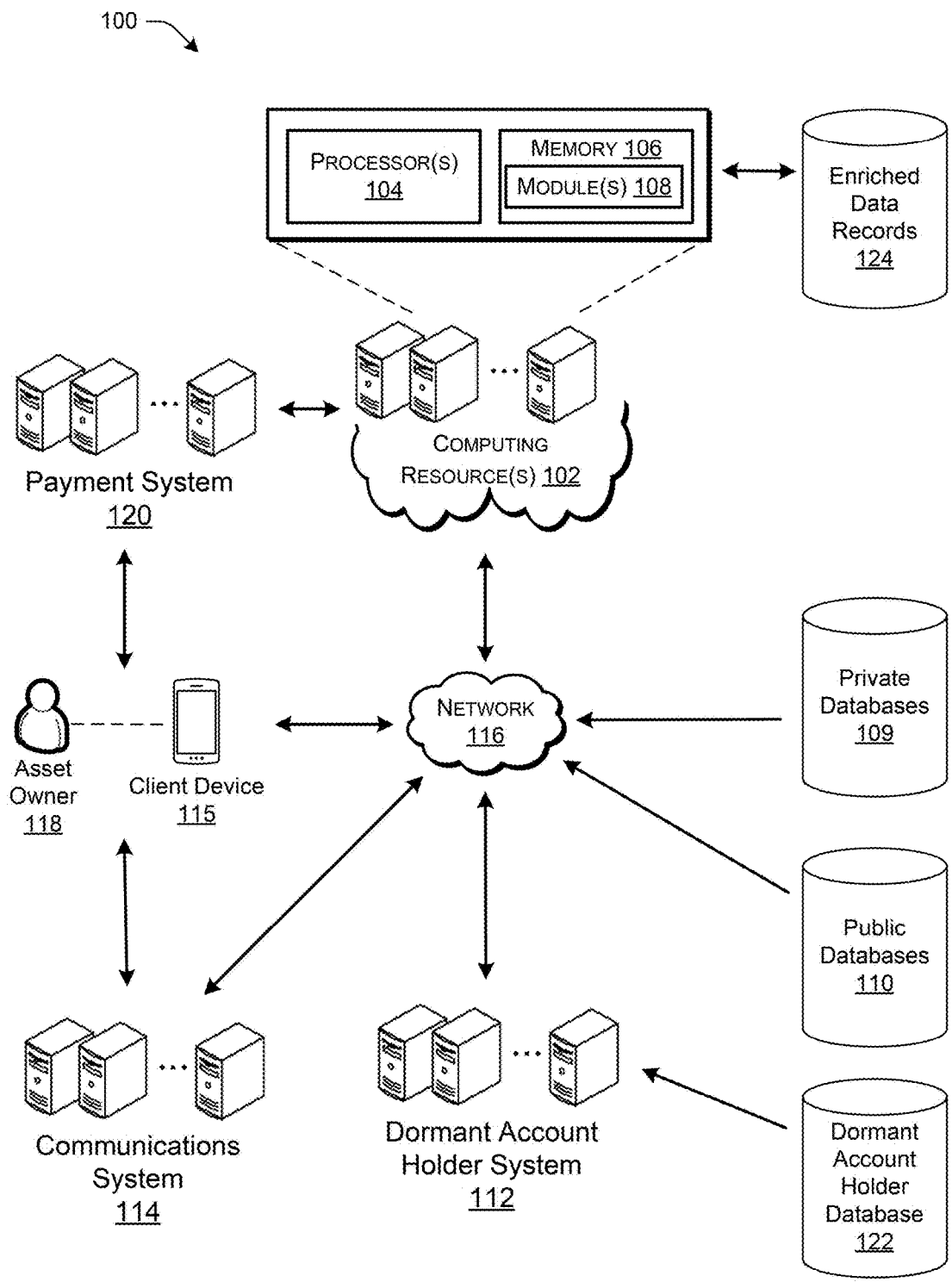
FIG. 1 illustrates a system for automating asset delivery to an owner, in accordance with some embodiments.

This disclosure generally relates to systems and methods for automatically returning assets to their rightful owners. There are millions of accounts worth hundreds of millions of dollars, or even billions of dollars, that are held for the rightful asset owners and escheated to governments simply because either the rightful asset owner cannot be appropriately contacted, or because the rightful asset owner is unaware of the assets. In these cases, after a period of time, a government takes ownership and control of the assets, which may include, without limitation, financial instruments, financial accounts, deposits, refunds, earned paychecks, dormant accounts, royalty payments, insurance proceeds, securities, dividends, IRA accounts, contents of safety deposit boxes, cashier's checks, personal property, and real property, among others.

In most jurisdictions, there are requirements that a company that has an asset in a dormant account must keep accurate records of that account and make reasonable attempts to contact the asset owner to return the asset. However, in many cases, the efforts are mere de minimus and the rightful asset owners are never aware of the dormant account or the asset that they are owed. The dormant accounts may be held by any of a number of companies, which may include financial institutions, former employers, utility companies, real estate lenders, impound accounts, escrow accounts, among others.

Typically, where a dormant account exists, a company may send correspondence to the last known address of the asset owner. There are some companies that specialize in finding asset owners and helping to deliver the assets to the owners for a fee; however, these companies typically must manually search for each individual asset owner. This is cumbersome, time consuming, and inefficient. Furthermore, because the fee charged to the asset owner may typically be a percentage of the asset value, only the largest value assets provide sufficient motivation for a company to search out the asset owner in exchange for a percentage of the asset value. This leaves millions of asset owners devoid of their property.

According to some embodiments, a system is provided that automatically finds the asset owners and electronically delivers the assets to the rightful owners with little or no human intervention. This results in an efficient process that helps not only the asset owner by reuniting them with their asset, but also the dormant account holder that is no longer required to maintain records of the account or make repeated attempts to contact the asset owner at a last known address.

As used herein, a dormant account holder is any entity that has an asset that has not been returned to the rightful owner. The dormant account holder may include, without limitation, a former employer, a utility company, a company holding a deposit or refund, or any other entity that is holding an asset of value that has not been returned to the rightful owner. A dormant account holder may include a company, a utility, a governmental agency, an educational institution, a real estate company, a landlord, or any other such company that holds a valuable asset for another.

As used herein, an asset owner is the rightful owner of the asset within a dormant account. In many cases, an asset owner may not know of the dormant account or the asset that belongs to them. In many cases, the asset owner may have moved and the last-known address on file with the dormant account holder is no longer valid. Similarly, all the contact information of an asset owner may be out of date according to the dormant account holder's records. In these cases, the dormant account is at risk of escheatment.

According to some embodiments, a system may be configured to take the existing asset owner data, which may include, without limitation, contact information such as last known address, telephone or cellphone number, email address, place of work, etc.; financial information such as banking institution information, account numbers, etc.; personal information such as marital status, social security number, tax ID number, known relatives, or other such information. Of course, other information may be available within the existing asset owner data; however, in some cases, the existing asset owner data may be out of date or insufficient to effectively contact the asset owner. The system may be configured to use the available information provided by the dormant account holder and supplement this information by researching databases to enrich the information with additional details, such as current address, current employer, current cellphone number, and any other information that may be useful in contacting the asset owner.

With reference to FIG. 1, a system 100 may include computing resources 102 having access to one or more processors 104 and memory 106 storing one or more modules 108. The computing resources 102 may include any suitable computing resources, which may include one or more server computers, a distributed computing architecture, cloud computing resources, or otherwise. The processor(s) 104 may include a central processing unit (CPU), a graphics processing unit (GPU) both CPU and GPU, or other processing units 104 or components known in the art. Additionally, each of the processors 104 may have access to memory 106 or may have its own local memory 106, which may store the one or more modules 108 which may include program data, operating system, or other type of instructions that cause the processor 104 to carry out acts. The processor 104 may include multiple processors and/or a single processor having multiple cores. The computing resources 102 may include distributed computing resources and may have one or more functions shared by various computing devices.

The computing resources 102 may have memory that includes computer-readable storage media ("CRSM"), which may be any available physical media accessible the by processor(s) 104 to execute instructions stored on the memory 105. In some implementations, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 104.

In some embodiments, the computing resources 102 are in communication with one or more other computing systems including, but not limited to, private databases, 109, public databases 110, dormant account holder system 112, a communications system 114, a client device 115 associated with an asset owner 118, and a payment system 120. The communications between the variously described systems may be performed over a network 116, as is generally known in the art.

In some cases, the dormant account holder system 112 may include a dormant account holder database 122, that may be populated with data regarding dormant accounts, and may include any information associated with an asset owner.

The various computing systems described herein, such as, without limitations, the dormant account holder system 112, the communications system 114, the client device 115, and the payment system 120, may all be in communication at one time or another with the computing resources 102 to facilitate the methods, processes, and systems described herein. The computing systems may be local system with one or more server computers, distributed computing system, cloud computing systems, or a combination of variously computer architecture systems.

The computing resources 102 may be in communication with an enriched data records 124 database which it may maintain and populate with data associated with an asset owner. In some cases, the enriched data records 124 populated by the computing resources 102 will contain more recent data, or additional data not found in a corresponding asset owner data record of a dormant account holder database 122. In some cases, the enriched data records 124 will contain an entry that corresponds with an asset owner data record contained in the dormant account holder database 122, but the enriched data record 124 may contain additional information not found in the dormant account holder database 122.

Figure 2:
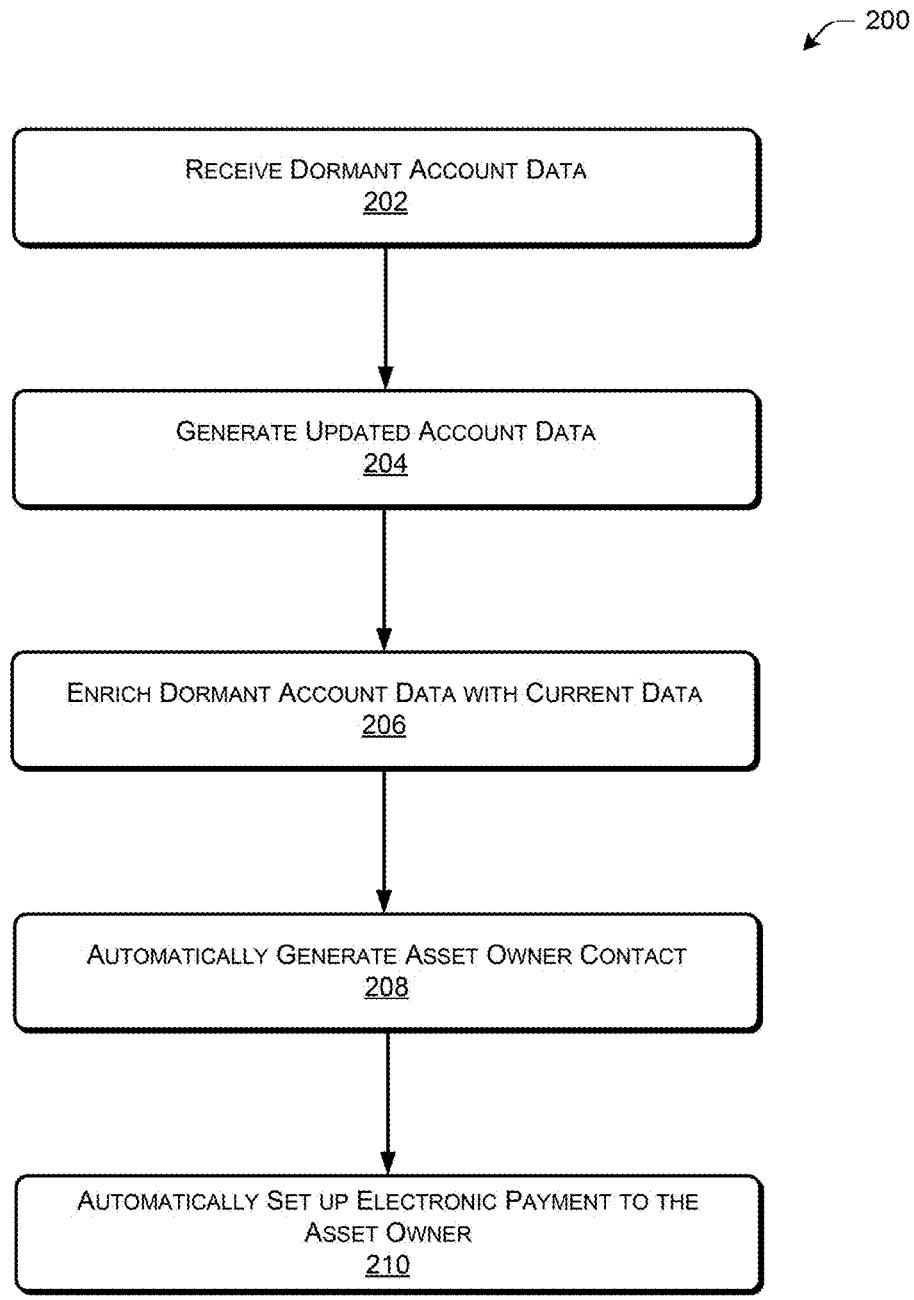
FIG. 2 illustrates a process for automating asset delivery to an owner, in accordance with some embodiments.

With reference to FIG. 2, an example process flow and operation of the system 100 will be described from the perspective of the computer resources 102. At block 202, the computing resources 102 receives dormant account data. For example, data associated with a dormant account may be retrieved from the dormant account holder database 122 by the dormant account holder system 112 and send, such as via network 16, to the computing resources 102.

The computing resources 102 may store the dormant account data in the enriched data records 124 database prior to, or during, a time in which the computing resources generates additional data to add or replace in the dormant account data record. The computing resources may retrieve, discover, or generate new data to add to the dormant account record in the enriched data records 124 database and either replace or append the new data to create an enriched data record that includes additional or alternative information to the data provided from the dormant account holder database 122. The additional data may be generated based upon searching one or more private databases 109. In some examples, the computing resources 102 are under control of a licensed private investigator who may have access to private databases that are not generally available to the public.

For example, a licensed private investigator is a person that is licensed by one or more states and is able to access sensitive personal information that is not generally available to the public. This is due, in large part, because a licensed professional is required to complete mandatory education, training, and has been evaluated for probable integrity and trustworthiness. A licensed professional is held to a high standard of care with the available information. For example, if the private investigator improperly accesses or abuses the information, the licensed private investigator can lose his professional license and further be subject to penalties.

At block 204, the computing resources 102, under control of a licensed private investigator, may access proprietary databases which may include, without limitation, address history, email addresses, deceased records search, phone numbers, social security records, bank records, credit bureau records, criminal records, property records, vehicle records, domain registrations, aircraft ownership, boat ownership, among other types of information. The computing resources 102 may compare the information from the private databases 109 with the information stored in the enriched data records 124 and may append or replace data fields with more pertinent information. This may include more up to date contact information or adding information that was missing from the data record. For example, the enriched data record may be generated to include an updated email address, cell phone number, last-known job, or a determining of living or deceased. This data may be generated and appended within the enriched data record 124 to generate updated account data associated with individual account holders.

While the description uses examples that rely on a single data record, it should be appreciated that the enriched data records 124 may contain tens of thousands, hundreds of thousands, or millions of individual data records associated with unique asset owners. An advantage of the described system and methods is that, in many embodiments, the computing resources are configured with instructions that cause the computing resources to automatically retrieve information from the private databases 109, the public databases 110, and generate enriched data records 124 to store in the enriched data records database.

At block 206, the computing resources 102 may compare retrieved data from private databases 109 and/or public databases 110 with data in the enriched data records 124 and may supplement account data with current data. For example, in the case where an asset owner moves, the computing resources may compare two known addresses and determine which address is the most current and supplement the account data with the current data to generate the enriched data record. The same may be true for any type of data associated with the asset owner 118.

At block 208, the computing resources may automatically generate asset owner contact. For example, the computing resources 102 may send instructions to the communications system 114 with asset owner 118 information, such as from the enriched data record 124 associated with the asset owner 118, and the communications system 114 may initiate contact with the asset owner using information from the enriched data record 124. As an example, where the enriched data record 124 includes updated information related to an asset owner's physical address, cellphone number, or email address, the communications system 114 may generate a communication to contact the asset owner 118 through any known form of communication. As a further example, the communications system 114 may generate a message and send the message to the asset owner's cellphone number. The generated communication may include any of a number of textual elements, graphical elements, hyperlinks, and use any type of messaging protocol such as, without limitation, short message service (SMS), multimedia messaging service (MMS), enhanced message service (EMS), instant message (IM), and other types of messaging protocols.

In some cases, the generated communication may include personal information about the asset owner, such as, the asset owner's name, account number, dates for which the asset owner was a customer or employee of a dormant account holder, as well as other information. The generated communication may additionally include a link to allow the asset owner 118 to receive the asset.

At block 210, the computing resources may communicate with a payment system 120 to enable the asset owner to receive the asset. In some cases, the generated communication may include a link that directs the asset owner to the payment system 120 that may be set up to allow the asset owner 118 to provide verification of identity and then electronically receive payment of the asset. The payment system 120 may be configured to send payment through any suitable electronic means or non-electronic means. Current examples of electronic payment platforms include platforms such as Venmo®, Zelle®, Xoom®, PayPal®, Google Pay®, and Apple Pay®, among others. These exemplary payment platforms may also be referred to as peer-to-peer payment services in which funds are transferred directly from a first account to a second account. In some cases, the second account may be a bank account, a rewards cards, a credit card, a debit card, an account associated with the payment platform, and the like. In some cases, a payment may be delivered to the asset owner by delivering a physical financial instrument, such as a check, a cashier's check, a stock certificate, cash, a certificate of deposit, or some other physical financial instrument.

In some instances, a dormant account holder may have hundreds or thousands of dormant accounts that each belong to unique asset owners 118. The described system and methods facilitate the dormant account holder to efficiently find the asset owners by generated enriched data records and providing an electronic means for transferring the monetary assets to the asset owners 118. In some examples, the described steps may be performed automatically. For example, the computing resources may receive data from the dormant account holder database 122, which may be in a comma delimited file, a database file, a spreadsheet file, or some other data structure and then proceed to automatically search through public databases 110 and/or private databases 109, generate the enriched data record associated with an asset owner 118, generate a communication through the communication system 114 to the asset owner 118, verify the asset owner identity, and electronically transfer the monetary asset to the asset owner 118.

Figure 3:
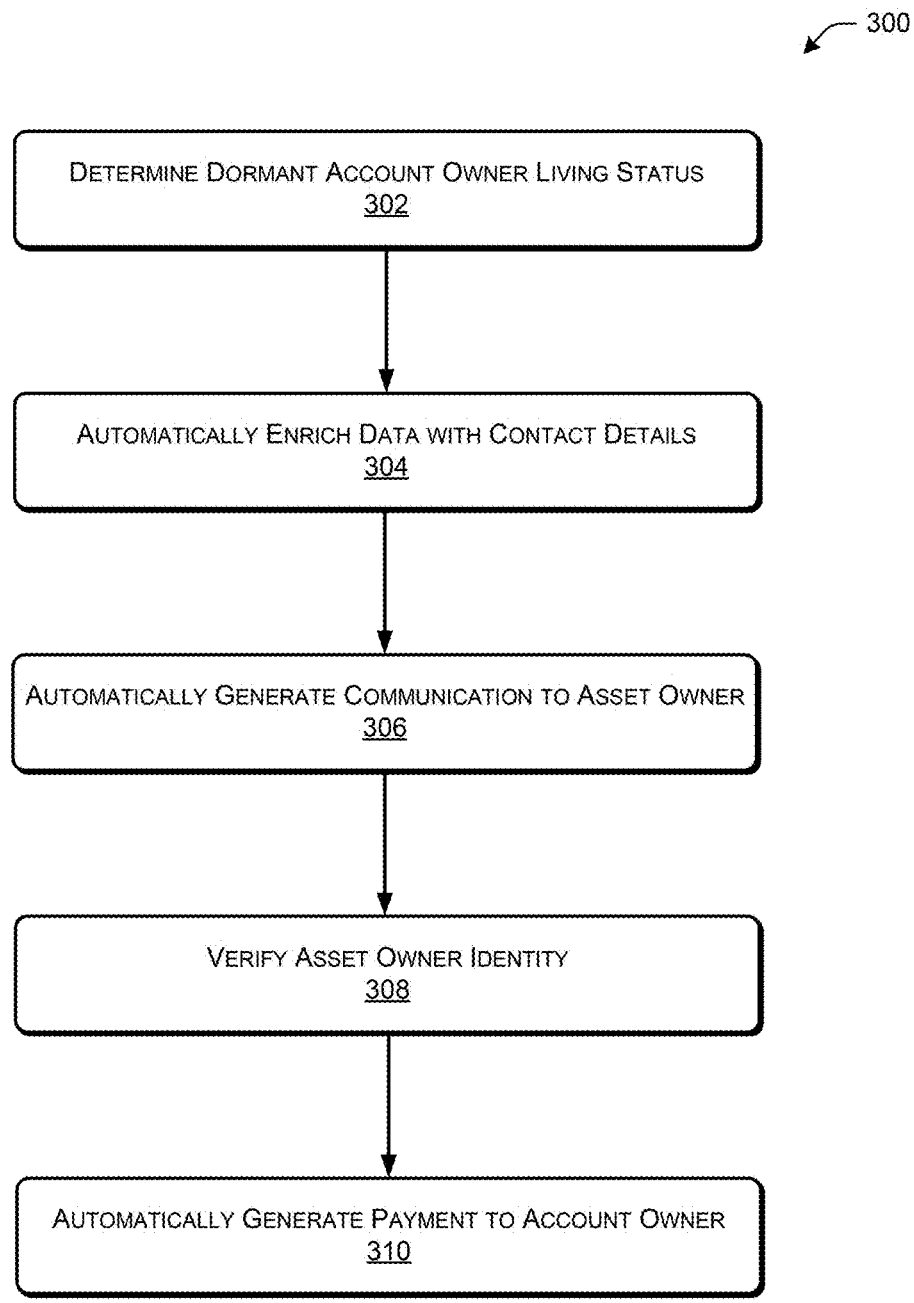
FIG. 3 illustrates a process for automating asset delivery including data enrichment, in accordance with some embodiments.

FIG. 3 illustrates a process flow 300 for verifying an asset owner. At block 302, the computing resources may determine the living status of a dormant asset owner. For example, where a data record is received from a dormant account holder database 122, the computing resources 102 may determine whether the asset owner associated with the data record is living or deceased. This may be performed, for example, by retrieving data from a living record database. In some cases, the system may infer a status of living, such as, for example, where an asset owner shows recent activity such as moving history, opening new accounts, changing telephone numbers, and the like.

At block 304, the system automatically enriches the data associated with the asset owner by storing data associated with a living status and any additional details generated during verification.

At block 306, the system generated a communication to the asset owner. The communication may include any of the details found in the enriched data record, and may include, as an example, an identification of the dormant account holder, the dormant account number, a date or date range during which the asset owner had a relationship with the dormant account holder, personal information of the asset owner, and the like. The communication may be sent through any suitable medium, and may include electronic communication (e.g., email, text messaging, etc.), physical mail sent to the asset owners' last known address, telephone communications, or some other form of communication. In some cases of electronic communication, the communication may include a link (e.g., hyperlink) to visit one or more websites, such as to verify the identity of the asset owner and/or verify the identity of the dormant account holder, or arrange delivery of the asset.

At block 308, the system may verify the identity of the asset owner. This may be performed through any suitable method, and may include, for example, requesting the asset owner to identify a previous address, telephone number, past or present relationship with a $3^{rd}$ party merchant, verify a payment range on a credit or mortgage account, or some other form of verification.

At block 310, a payment is automatically generated to the account owner. In some cases, the payment is an electronic payment sent through an online payment processing center and the asset owner may be prompted to choose a payment merchant to receive the payment from.

Figure 4:
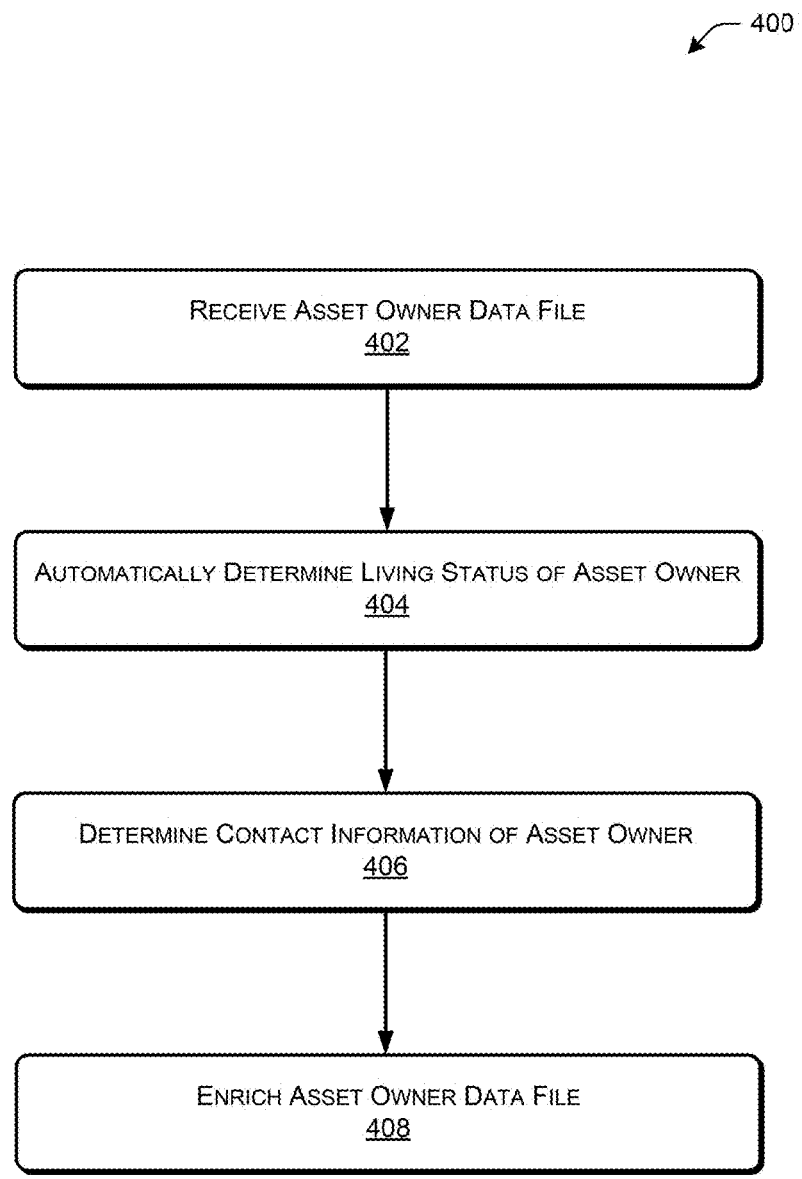
FIG. 4 illustrates a process for automatically enriching asset owner data records, in accordance with some embodiments.

FIG. 4 illustrates a logical process flow for enriching an asset owner data record. At block 402, the computing resources 102 may receive an asset owner data file. This may come, for example, from a dormant account holder who has information associated with an asset owner. The asset owner may have had a prior relationship with the dormant account holder, and the dormant account holder may have assets, such as money, that it owes to the asset owner. In many cases, the dormant account holder has been unable to return the assets to the asset owner and may use a system, such as those described herein, to return the assets to their rightful owner.

At block, 404, the system determines the living status of the asset owner. This may be done, for example, by retrieving or generating data associated with current contact information, recent transactions, and the like.

At block 406, the system may determine contact information of the asset owner. The system may have access to public databases, private databases, as well as other sources of information to find contact information associated with the asset owner.

At block 408, the asset owner data file may be enriched with newly discovered or generated data associated with the asset owner, such as, without limitation, living status, the identification of family members or friends, credit history, telephone number, cellphone number, address, current or past employment, as well as other information. In some examples, the enriched data file may be used to generate a communication to the asset owner to return assets.

Figure 5:
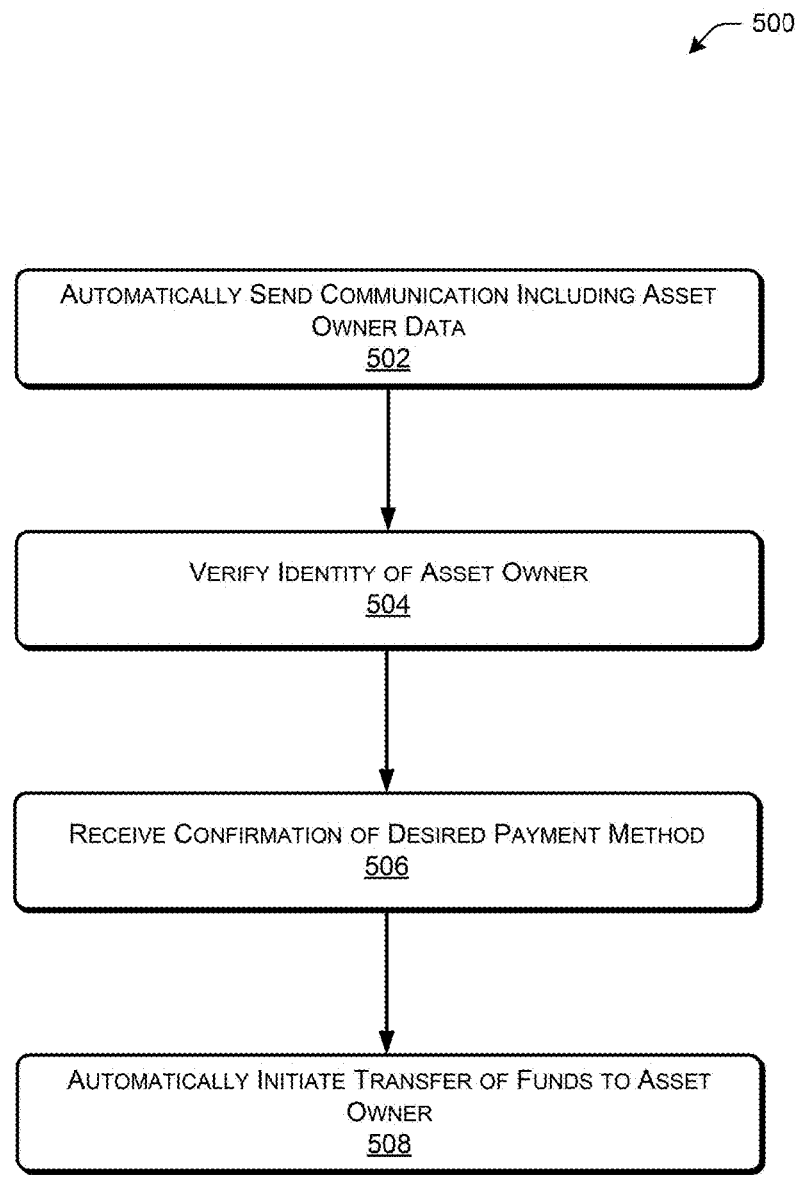
FIG. 5 illustrates a process for automatically verifying asset owner and initiating electronic delivery of asset to asset owner, in accordance with some embodiments.

FIG. 5 illustrates a logical process flow for generating a communication and initiating an asset return to the asset owner. At block 502, the system 100 automatically sends a communication to the asset owner, which may include asset owner data. For example, the communication may include a text message that indicates that a company is holding assets that belong to the asset owner. The assets may include, for example, a deposit, an overpayment on an account, a refund, a paycheck, among other things. The communication may further include asset owner data such as the asset owner name, address, information associated with the dormant account holder (e.g., identity of dormant account holder, logo of dormant account holder, account number, dates that asset owner was associated with dormant account holder, and the like).

In some embodiments, the communication is a one-to-one communication. In other words, a unique message is created for each unique recipient. In some cases, the message includes information specific to the asset owner, such as an account number, a date of service, an identification of the asset, the source of the asset, among other information that make the communication unique to each recipient.

At block 504, the system may verify the identity of the asset owner through any suitable method, such as those described herein in relation to other embodiments.

At block 506, the system receives confirmation of a desired payment method. For instance, the asset owner may be prompted to select a desired payment method, and the system receives confirmation of the desired payment method. This may be done electronically, such as by the asset owner selecting from a list or drop-down menu, and the selection may be transmitted to the computing resources 102. The payment method may include one or more of an electronic payment, automated clearing house payment, physical check, a credit at a merchant, a credit with the dormant account holder, a gift card, and the like.

At block 508, the computing resources 102 may automatically initiate transfer of the asset to the asset owner. The computing resources 102 may instruct the payment system 120 to send money to the asset owner through the desired payment method.

Figure 6:
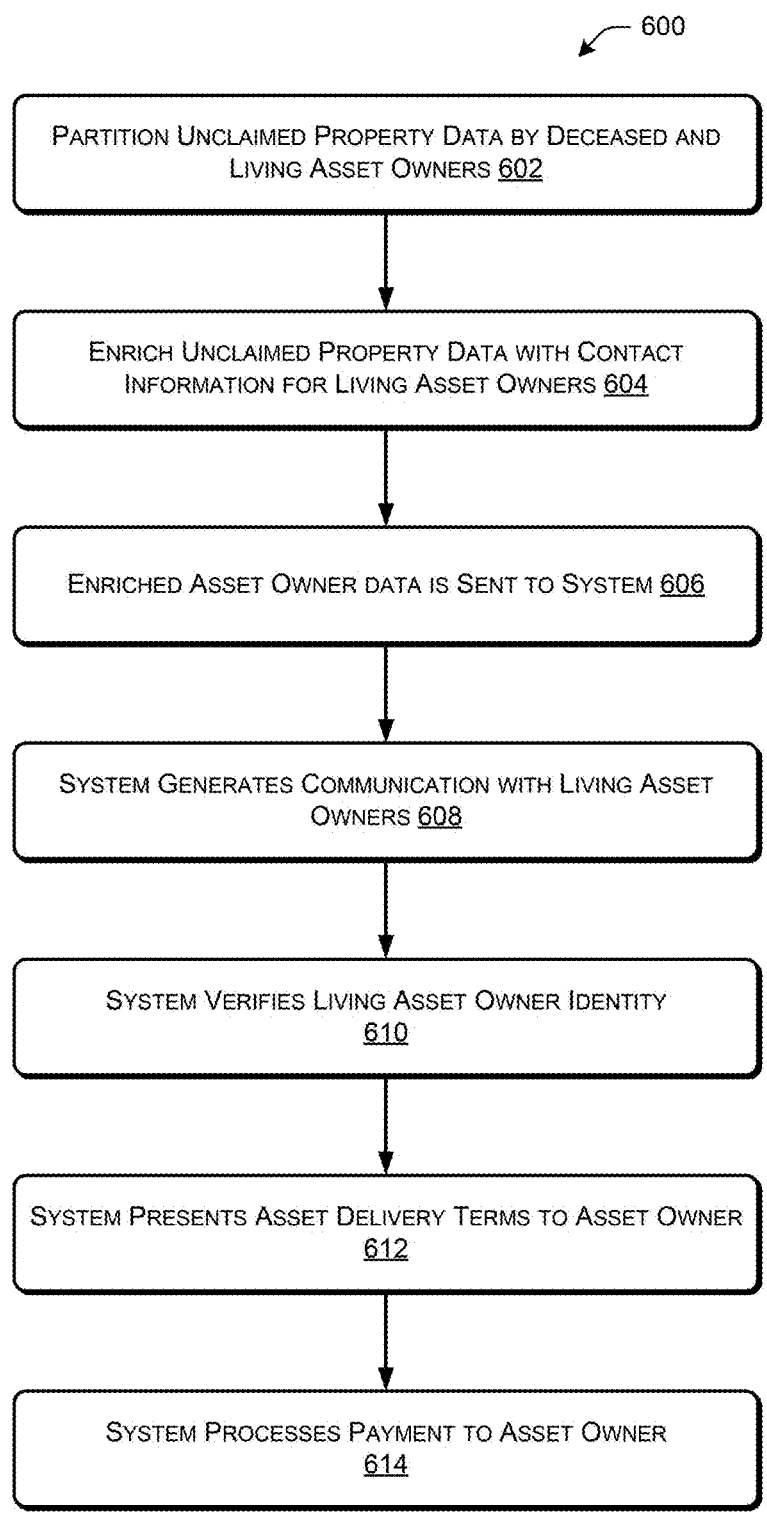
FIG. 6 illustrates an automated process for enriching asset owner data, generating a communication to the asset owner, and returning the asset to the asset owner, in accordance with some embodiments.

FIG. 6 illustrates a logical process flow 600 for automatically enriching asset owner data, generating communications, and delivering asset to asset owner.

At block 602 the system (e.g., computing resources 102), partitions a list of unclaimed property data by deceased and living asset owners. In many cases, assets belonging to owners who have deceased can no longer be claimed, but rather, the property is escheated to the government. Thus, bifurcating the unclaimed property by living and deceased asset owners increases efficiency by only processing asset owner data for the living asset owners.

At block 604, the unclaimed property data is enriched with contact information for the portion of the data associated with living asset owners. The contact information may include any information described herein and be generated according to any method with respect to any embodiment herein.

At block 606, the enriched asset owner data is sent to the computing resources 102. This may be performed, for example, by a push from a remote computing system t the computing resources 102, by a pull from the computing resources 102, or through some other protocol. In some cases, the enriched data records 124 are stored in a relational database and may be stored on a physical memory associated with the computing resources 102. In some cases, the enriched data records 124 are stored remotely from the computing resources 102.

At block 608, the system generates a communication and sends it to the living asset owners. The communication may be any form of communication, such as those described herein, and may further include any information that may allow an asset owner to have confidence that the communication is legitimate, as described elsewhere herein with regard to embodiments described.

At block 610, the system verifies the living asset owner identity, such as through challenge questions to the living asset owner.

At block 612, the system presents asset delivery terms to the asset owner. For example, the asset owner is presented with a dollar amount of the owed asset, and the asset owner must agree to provide a portion of the asset as remuneration to a third party facilitating the return of the asset. The terms may also include other terms, such as terms related to delivery time, delivery location, delivery amount, and the like.

At block 614 the system processes payment to the asset owner. In some cases, the system may send instructions to a financial payment system with a payment amount and a delivery address to initiate the payment to the asset owner. The delivery address may be an electronic address such as an email address, a telephone number address, and internet protocol address, an account number, a username to an account, or some other identifier that allows a payment to be sent to a desired recipient.

It should be appreciated that while examples presented herein may describe a single data record and a single communication, it should be appreciated that the described systems and methods can provide hundreds of thousands, or more, enriched asset owner records, and unique communications to each of those asset owners, very efficiently and in a short period of time. Furthermore, where an asset owner may not be located or may not respond to a communication, the system can continue to search for updated contact information and the generate a new communication once the system receives updated contact details for the asset owner. The system may store asset owner data for asset owners that do not have valid contact information and continue to look for updated contact information on a scheduled basis, such as every month, or every three months, or every six months, or some other interval.

In many of the examples herein, a dormant account holder may fund an escrow account based upon the volume of dormant accounts that it holds. As asset owners receive their assets and deplete the escrow account, the dormant account holder may replenish the escrow account once an account threshold has been met. The described systems and methods offer numerous benefits to the dormant account holder as well as the asset owner. For example, the record keeping burden on the dormant account holder may be onerous and may be dictated by state laws. Accordingly, a dormant account holder that has locations in multiple states must be aware of, and comply with, the different state laws. By efficiently reuniting an asset owner with the asset, this relieves the burden on the dormant account holder in terms of operating expense and record keeping costs. Furthermore, where a dormant account holder is proactive about returning assets to the asset owners, it creates goodwill in the company from customers and employees. Finally, returning the asset to the asset owners provides a monetary benefit to the asset owner, which is a mutual benefit to both the dormant account holder and the asset owner.

Figures 7A, 7B, 7C:
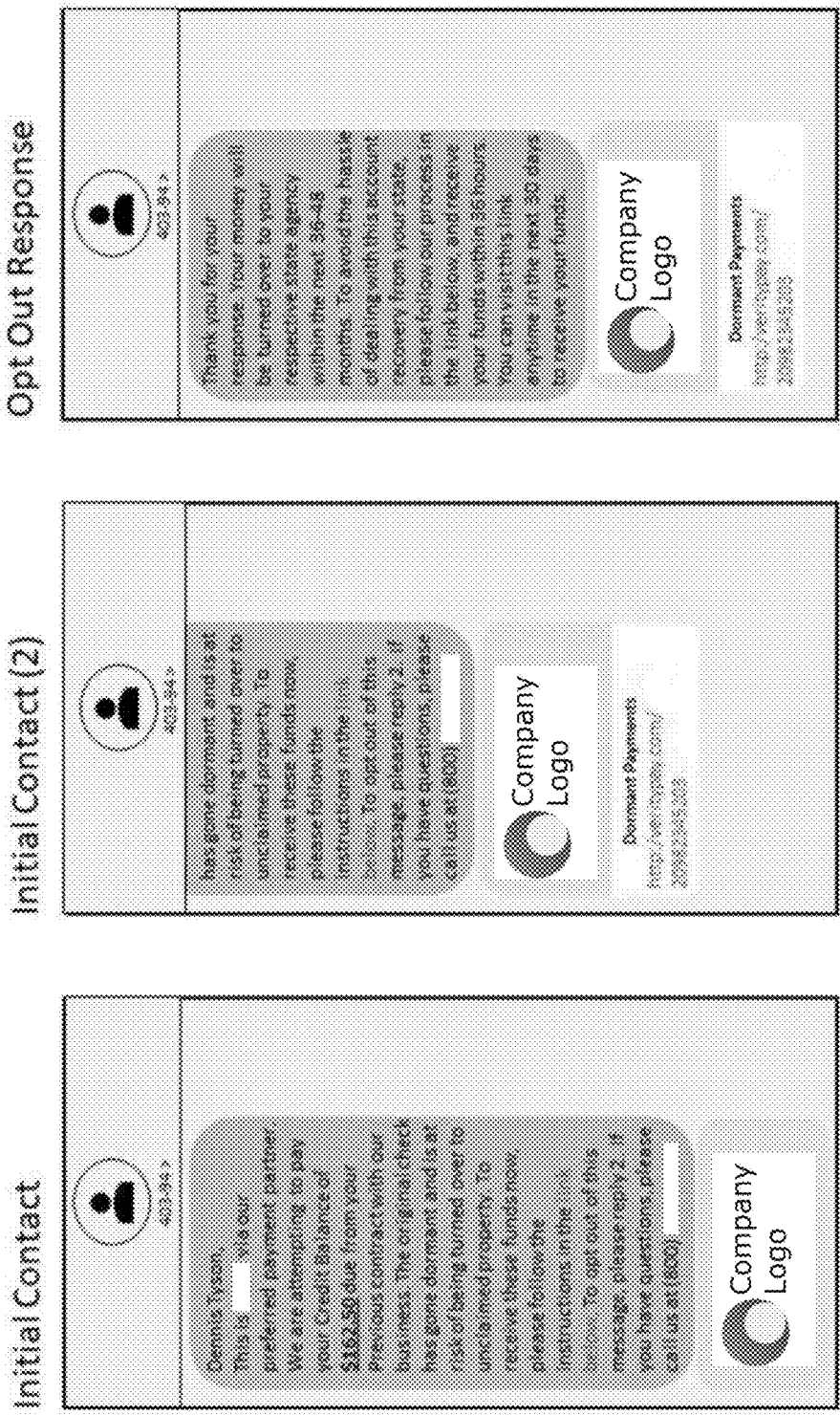
FIGS. 7A, 7B, and 7C illustrate example generated communications to an asset owner, in accordance with some embodiments.

With reference to FIGS. 7A, 7B, and 7C, a series of generated communications are illustrated. FIG. 7A represents an initial contact with an asset owner once the asset owner data record has been enriched with current contact information. According to the illustrated example, the generated communication is being sent through a text message to the asset owners cellular telephone. The initial communication may include any suitable information to lend legitimacy to the communication and may include, for example, the asset owners name, an account number, a date of contact between the asset owner and the dormant account holder, a company logo or company name associated with the dormant account holder, and instructions for either claiming the asset or opting out of claiming the asset.

FIG. 7B illustrates a communication containing a link, such as a hyperlink, that directs the asset owner to a website to verify the identity of the asset owner and claim the asset.

FIG. 7C illustrates an example communication in which the asset owner has chosen to not receive the asset through the system. By opting out, an asset owner can decline to claim the asset through the systems and processes described herein, but rather, can either contact the dormant account holder directly to claim the asset, wait until the dormant account has been escheated and turned over to the government and the asset owner can go through the unclaimed property process that is overseen by a local government, or chose not to pursue the asset in which case the asset will escheat to the government.

Figure 8:
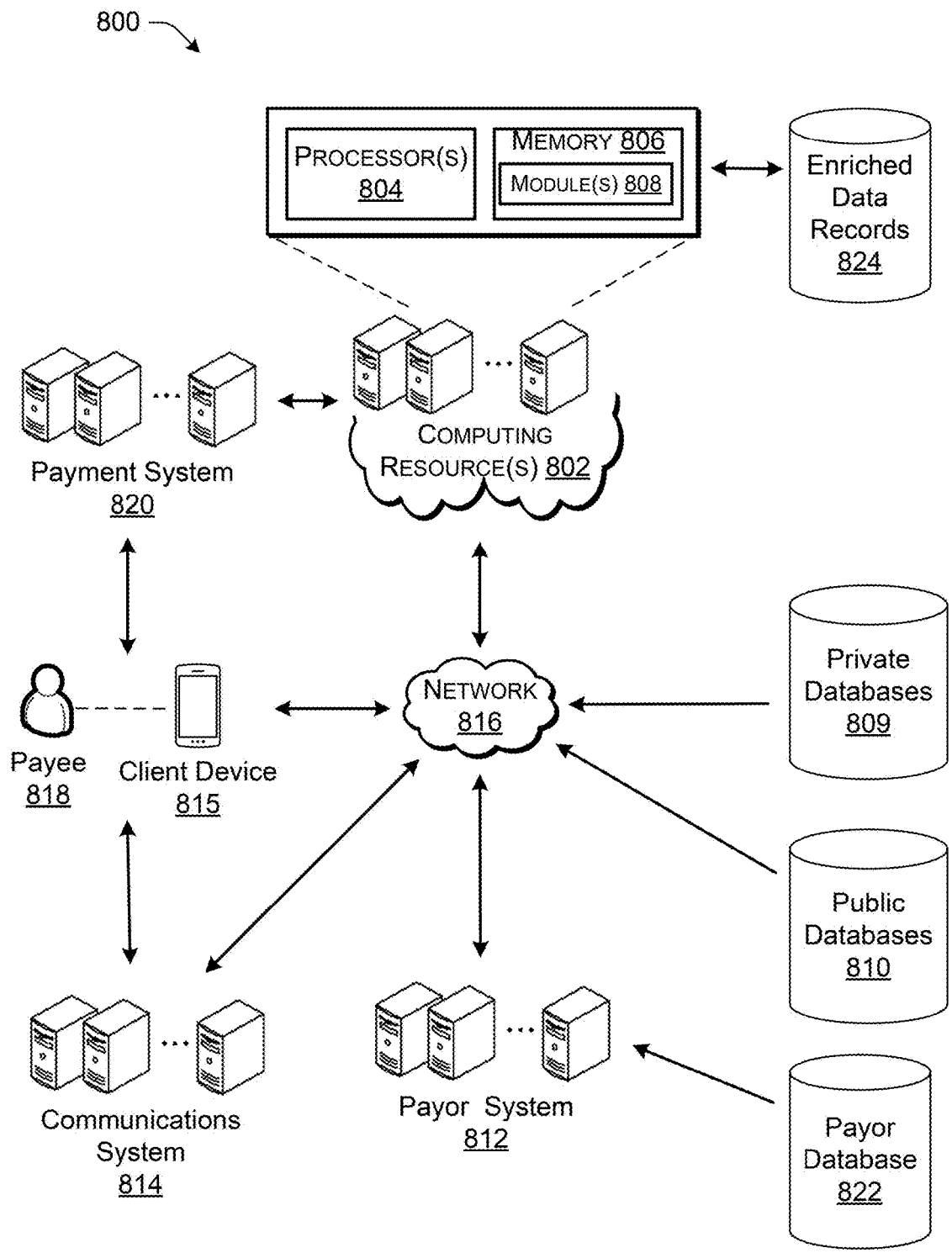
FIG. 8 illustrates a system for automating payment delivery to a payee, in accordance with some embodiments.

FIG. 8 illustrates a system 800 for verifying the identity of a payee and processing a payment to the payee. There are many circumstances where a payor owes remuneration to a payee. In some cases, a payor needs to make copious transfers to a plurality of payees. In some cases, especially where the payment amount is below a threshold, initiating a payment to a payee may cost a considerable percentage of the payment amount, and in some cases, initiating the payment may cost more than the amount of the payment itself.

For example, where a payor owes small amounts of money to numerous payees, the cost of administering the payment process, including paying employees, the cost of equipment and supplies to print checks, postage, and the like may result in a cost that is a significant amount compared with the total of the payments. In some cases, the costs to process the payments may be greater than 10%, or 20%, or 30%, or 50%, or 80%, or 100% or more compared with the amount of the payment or payments. In some cases, the payor is disincentivized from issuing owed payments because of the cost of processing the payments when compared to the amount of the payments.

In some cases, the systems and methods disclosed and described herein may provide for an efficient system to handle copious payments, especially those of a smaller amount. In many cases, the systems described herein, such as with reference to FIGS. 1-7C, allow for numerous payments to be made by relying on a subset of the components and process steps described.

The system 800 includes computing resources 802 that may be any suitable computing resources, such as those described elsewhere herein, and may be one or more localized servers, may be a distributing computing environment, or some other architecture. The computing resources 802 may have one or more processors 804 and physical memory 806 that may store one or more modules 808 executable by the one or more processors 804 to perform acts.

The system 800 may have access to one or more private databases 809, public databases 810, and other information. A payor system 812 may be in communication with a payor database 822 that stores one or more payee data records. A communications system 814 may be in communication with the computing resources 802 and/or the payor system 812, such as through a network 816, as described elsewhere herein with respect to any of the embodiments.

The communication system 814 may be configured to generate and/or send a communication to a payee 818, such as by sending an electronic message to a client device 815 associated with the payee. A payment system 820 may be in communication with the computing resources 802 and can be configured to process a payment to the payee 818. In some cases, the computing resources 802 may generate a communication to a payee 818, such as by incorporating data contained in the payee data records, or the enriched data records 824 in order to send a communication to the payee that allows the payee to ascertain the purpose of the communication. Such a system may be configured to allow a payor to electronically send payments to numerous payees with a high degree of automaticity, for a very low cost. In some cases, the system may be provided as a service and a payor may subscribe to the service. In some cases, the system may be licensed to a payor. In some cases, the system is made available to a payor on a per transaction basis.

Figure 9:
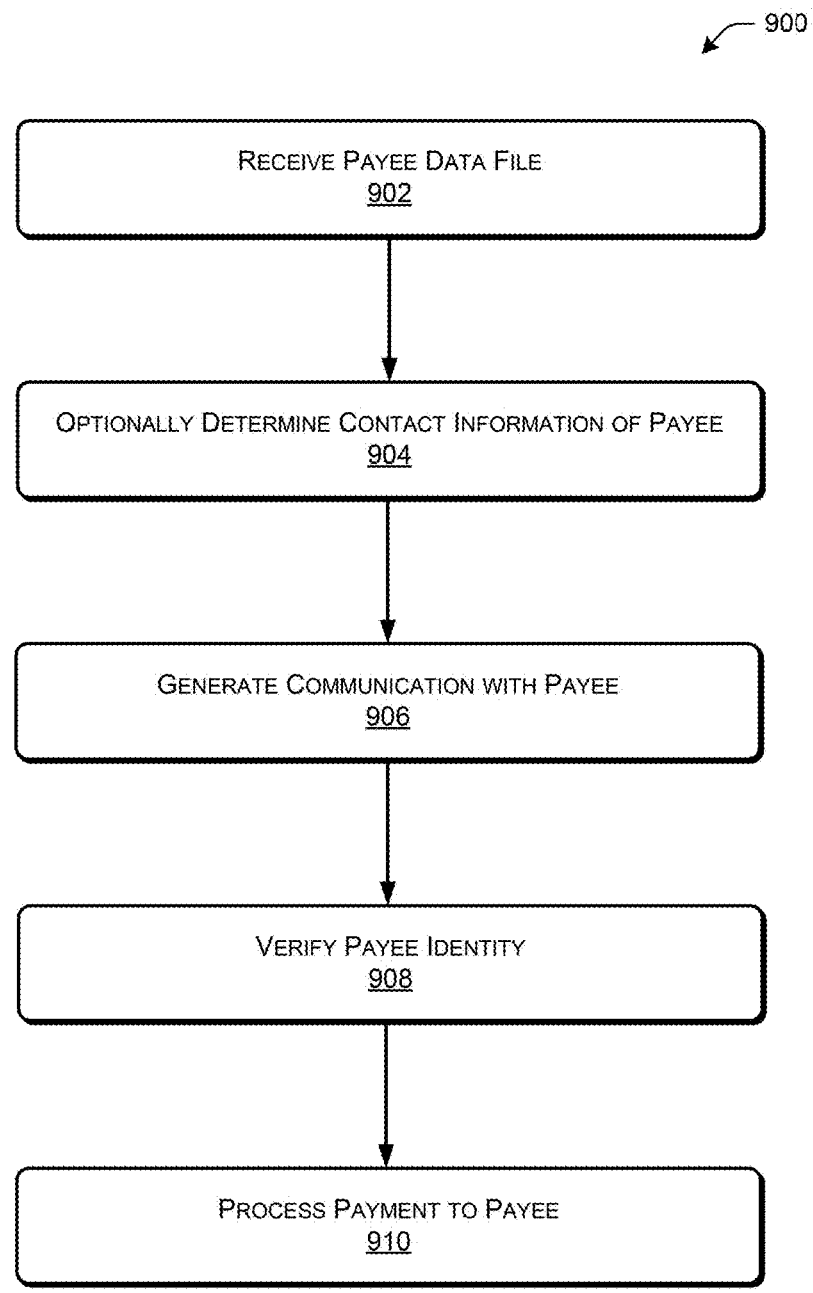
FIG. 9. illustrates a process for automatically verifying the identity of a payee and processing a payment to the payee, in accordance with some embodiments.

With reference to FIG. 9, at block 902, the system may receive a payee data file. The payee data file may include data identifying a payee and an amount of a payment, among other things. For instance, the payee data file may include one or more of a payee name, a physical address, an email address, a cellular telephone number, a home phone number, an account number, a payment amount, a date of service associated with the payment, among other things. In some cases, the system may enrich the data provided in the payee data file, while in other cases, there may not be a need to enrich the data because the provided data is sufficient to carry out the process. In some cases, the system may enrich the data provided in the payee data file, such as, for example, by discovering updated contact information, in which case the payee data file may be enriched with the new data and updated. In some cases, the payee data file may be a part of a larger set of data files that may include a plurality of payee data files. For instance, an entity may provide payee data files for numerous payees, such as in a database file, or some other file format that the system can read and use to process payments.

At block 904, the system may optionally determine contact information of one or more payees. For instance, as discussed in relation to embodiments herein, the system may search private and/or public records databases to discover contact information for a payee that may not be provided in the payee data file. The system can therefore enrich the payee data records, if necessary, and use the enriched data records in carrying out the methods described herein.

At block 906, the system generates a communication with one or more payees. The communication may be any type of suitable communication, as described herein, and may include information to allow the payee to ascertain what the payment relates to. For example, the communication may include one or more of a payee identity, an amount of payment, reason for payment, a date the payment became due to the payee, an identification of the payor, an account number associated with the payment, and a way to receive the payment, among other things.

At block 908, the system verifies the identity of the payee and may be done by any suitable method, such as those discussed herein.

At block 910, the payment may be processed and delivered to the payee. In some cases, the payee is aware that the payment is owed to the payee, while in other cases, the payee may not be aware that the payment is owed. In some cases, the payee can electronically receive the payment, such as through any suitable electronic payment platform as described elsewhere herein.

As a non-limiting example, a class action lawsuit may identify individual members of a plaintiff's class. In some cases, the class may number hundreds, thousands, tens of thousands, or more individuals. When the class action receives a final disposition, each of the members of the class may be entitled to a portion of the class action proceeds. In some cases, the members of the class receive a small portion of the class action proceeds, and the cost for processing and delivering the payments may be a substantial cost when compared to the amount of the payments. The discloses system may receive payee data records associated with the members of the class, which may include payee name, mobile phone number, identification of the class action, and a payment amount. The system may automatically generate a unique communication to each class member that may include an identification of the class action, the member name, and a link to verify identity of the class member and/or to receive payment. The class member may follow the link to verify the class member's identity through any suitable method, and then select to receive an electronic transfer of the payment amount. This process may happen for thousands of class members, or an even larger number of class members.

The disclosed system is capable of quickly and efficiently handling large numbers of payments to individuals. In some cases, the system receives a spreadsheet containing payee names, contact details (e.g., mobile phone number), and payment amounts. The spreadsheet containing payee data records may number tens of thousands, and the system can efficiently process these payee data records, generate unique communications to each payee, verify the identity of each payee, and initiate an electronic payment to each payee. In many cases, the payee data records will include more than 10 unique payees, or more than 100 unique payees, or more than 1000 payees, and the system can be configure to automatically generate a communication and initiate an electronic funds transfer to the payees.

Figure 10:
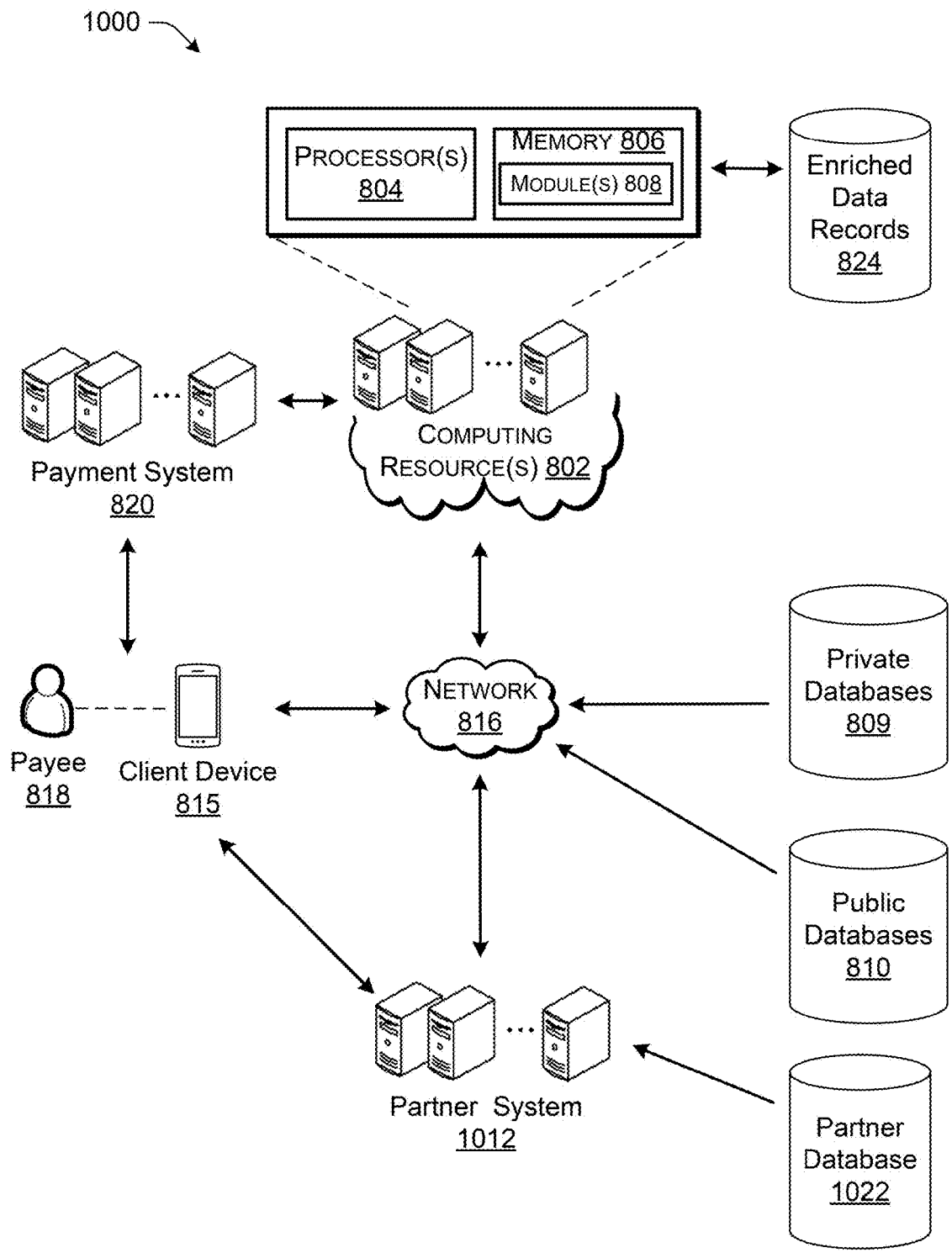
FIG. 10 illustrates a system for automating payment to a payee, in accordance with some embodiments.

FIG. 10 illustrates a system 1000 for automating a payment to a payee in accordance with some embodiments. In some cases, where a payor desires to make financial transfers to numerous payees, the cost of administering the payment process, including paying employees, the cost of equipment and supplies to print checks, postage, and the like may result in a cost that is a significant amount compared with the total of the financial transfer. In some cases, the costs to process the payments may be greater than 10%, or 20%, or 30%, or 50%, or 80%, or 100% or more compared with the amount of the financial transfer. In some cases, the payor is disincentivized from issuing owed payments because of the cost of processing the payments when compared to the amount of the payments.

In some cases, the systems and methods disclosed and described herein may provide for an efficient system to handle copious payments, and can lead to a great deal of automation while still ensuring privacy, efficiency, and accuracy. In many cases, the systems described herein, such as with reference to FIGS. 1-9, allow for numerous payments to be made by relying on a subset of the components and process steps described.

The system 1000 may share many of the components as other embodiments described herein, such as those illustrated in relation to FIG. 8. The system 1000 includes computing resources 802 that may be any suitable computing resources, such as those described elsewhere herein, and may be one or more localized servers, may be a distributing computing environment, or some other architecture. The computing resources 802 may have one or more processors 804 and physical memory 806 that may store one or more modules 808 executable by the one or more processors 804 to perform acts.

The system 800 may have access to one or more private databases 809, public databases 810, and other information. A partner system 812 may be in communication with a partner database 1022 that stores one or more data records that may include the payee 818. The partner system may be in communication with the payee 818, such as through a client device 815 associated with the payee. For instance, the payee 818 may have an account with the partner system 1012 and may receive trusted communications from the partner system 1012.

In a non-limiting example, the partner may be a bank at which the payee maintains one or more bank accounts, and the partner system 1012 may be a banking system with which the payee 818 has interactions. In some cases, the client device 815 associated with the payee 818 may have a banking application installed that facilitates communication between the partner system 1012 and the payee 818 and may allow the payee 818 to view details of one or more bank accounts. The partner system 1012 may include a communications system, and as described, may include an application that can send notifications, alerts, badges, icons, messages, or other forms of electronic communication to the client device 815 for the payee 818. The communications may happen through the network 816, as is generally known in the art.

In some examples, the partner system 1012 is configured to access a partner database 1022 that includes records that may contain data related to one or more payees. In some cases, the computing resources 802 may transmit data to the partner system 1012 that includes details of one or more payees, and the partner system 1012 may correlate the identity of the one or more payees with data stored in the partner database 1022. For example, where the computing resources send a social security number associated with a payee, the partner system 1012 may query the partner database 1022 to correlate the social number with a data entry in the partner database 1022. In the case that the partner system 1012 is able to correlate the payee with data stored in the partner database 1022, the partner system 1012 may send a confirmation of correlation to the computing resources and/or send a communication to the client device 815 associated with the payee 818.

As used herein, to "correlate" the data is used to mean that any identifying data sent by the computing resources 802 to the partner system 1012, is found by the partner system in the partner database 1022. For example, where the computing resources 802 sends identifying information, such as a name, address, telephone number, social security number, account number, or some other type of identifying information, where the partner system is able to find a match between one or more pieces of identifying information sent by the computing resources 802 in the partner database 1022, then the data is correlated. In other words, the data is correlated when the partner system 1012 determines that the payee has a current account or has a dormant account with the partner system 1012.

The partner system 1012 may be configured to generate and/or send a communication to a payee 818, such as by sending an electronic message to a client device 815 associated with the payee. The electronic message may be any suitable message, and may include a message sent through an application controlled by the partner system, such as a push notification, an alert, a text message, a dashboard message, or otherwise. The message may include text and/or images. The message may provide information to the payee that the payee is eligible to receive a financial transfer and may provide instructions for receiving the financial transfer.

In some cases, the payee is accustomed to receiving financial information from the partner system, 1012 and may be more likely to trust a notification regarding a financial transfer that is available to the payee than if the message simply came through an untrusted source.

A payment system 820 may be in communication with the computing resources 802 and/or the partner system 1012 and can be configured to process a payment to the payee 818. In some cases, the partner system 1012 may generate a communication to the payee 818, such as by incorporating data contained in the partner database 1022, to send a communication to the payee that allows the payee to ascertain the purpose of the communication. In some cases, the payment system 820 may be controlled or operated by the partner system 1012 and the financial transfer may be effectuated through the partner system 1012. Such a system may be configured to allow a payor to electronically send payments to numerous payees with a high degree of automaticity, for a very low cost.

Figure 11:
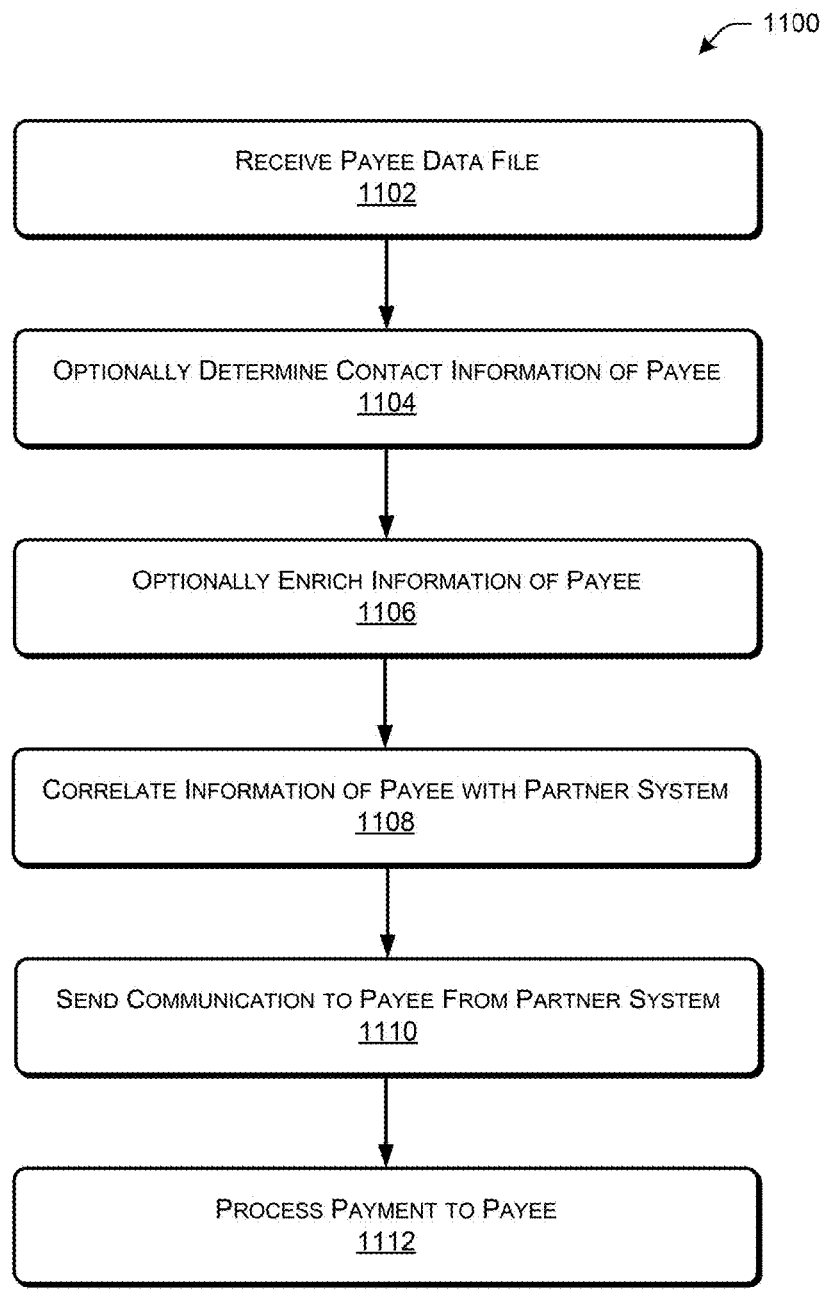
FIG. 11 illustrates a process for automating payment delivery to a payee, in accordance with some embodiments.

With reference to FIG. 11, at block 1102, the system 1000 may receive a payee data file. The payee data file may contain one or more data entries that identify one or more payees. The data file may be in any suitable file type or data structure types. In some cases, a data entry in the data file is associated with a payee and includes one or more types of identifying information, such as, for example, a name, last known address, social security number, birth date, employment information, relative information, tax identification number, drivers license number, or some other type of identifying information. The data file may additionally include details of a financial transfer to be made to the one or more payees, and may include the source of the financial transfers, the amount of the transfer, a date the transfer became available, and a date at which the financial transfer will be forfeited, among other information.

At block 1104, the system 1000 may optionally determine contact information of the one or more payees in the data file. This may be done, as described above, by searching one or more public or private databases to obtain additional information about the one or more payees. Additionally, the system 1000 may search death records to determine that the one or more payees are still living.

At block 1106, the system 1000 may enrich the data records, such as by updating employment information, contact information, living status information, and the like.

At block 1108, the system 1000 correlates information of the payee with the partner system. As an example, the partner system may be a bank, an electronic payment platform (e.g., Venmo®, Zelle®, Xoom®, PayPal®, Google Pay®, and Apple Pay®, among others), or some other type of financial or communication platform. The system 1000 may send the payee information (which may include the enriched data file) to the partner system, which determines that the one or more payees have identifying information that is found in the partner database (e.g., correlated). In some examples, correlating the payee information in the partner database indicates that the payee has a relationship with the partner, such as by having a financial account, a customer account, or some other type of relationship, with the partner. The payee information may be correlated by matching one or more pieces of data in the payee record with one or more pieces of data in the partner database. For example, where the payee record is received by a partner and it includes a name, a telephone number, an address, a birth date, and a social security number, the partner database may match a social security number to correlate the payee information. Similarly, where an identification number may not be available, the partner system may determine that the name, birthday, and address match a data record in the partner database to correlate the payee information with an entry in the partner database. In short, any piece of data or combination of pieces of data associated with payee information may be used to correlate the payee information with an entry in the partner database.

At block 1110, the partner system sends a communication to the payee. As described elsewhere herein, the communication may be through any suitable means, but in some cases, is sent as a push notification through an application controlled by the partner.

At block 1112, the financial transfer is sent to the payee. This may happen through any suitable mechanism, and may include depositing money into a payee account maintained by the partner, or may include another form of electronic funds transfer into any account associated with the payee. The financial transfer may come through a payment system not affiliated with the partner, or may come through the partner system 1012. In some cases, the financial transfer may be crypto currency and deposited into a crypto wallet associated with the payee. As used herein, the terms payment and financial transfer may be used interchangeably. The terms refer to the transfer of anything of value, which may include financial instruments, crypto currency, digital works, non-fungible tokens, currency, or any other thing having value that can be transferred electronically or digitally.

In some examples, the partner system 1012 may include a link on a website of the partner with a notification to all of its customers that may introduce the system 1000 as a trusted source of financial transactions.

There are numerous use cases for such systems and methods to greatly increase efficiency and reduce cost to payors that regularly send payments to payees. Such suitable instances include, without limitation, class action settlements, employee paychecks, income tax refunds, property tax refunds, insurance proceeds, retirement account payments, credit balance returns, social security payments, jury duty payments, court deposit refunds, overpayment refunds, event ticket refunds, retail rebate payments, airline ticket refunds, excess proceeds payments, government stimulus payments, manufacturer rebate payments, property tax refunds, prepaid debit card balances, unclaimed property payments, healthcare provider payment returns, dormant account payments, hospital payment returns, jail commissary balances, capital credit distributions, utility deposit returns, dormant bank balance returns, insurance premium returns, account overpayment credits, casino cash-outs, sports betting payouts, multilevel marketing commission payments, credit card perk payments, royalty payments, dormant royalty payments, among others.

In many cases, accounts below a threshold dollar amount are not escheatable to the government, and the account remains with the account holder. In some cases, where the amount of money in the account is small, the account holder will not process a payment to the payee because it becomes too expensive to initiate the payment or figure out a system in order to make the payments. The problem is exacerbated where a large entity has a copious number of payments to make. For example, a hospital may have thousands of accounts with small balances that need to be returned to the patients, such as a result of overpayment. The hospital may not deliver the small account balances to the patients because doing so is cost prohibitive to the hospital, and where the amount in the account is below a threshold, the account may not be escheatable so it may never be entered as unclaimed property.

Figure 12:
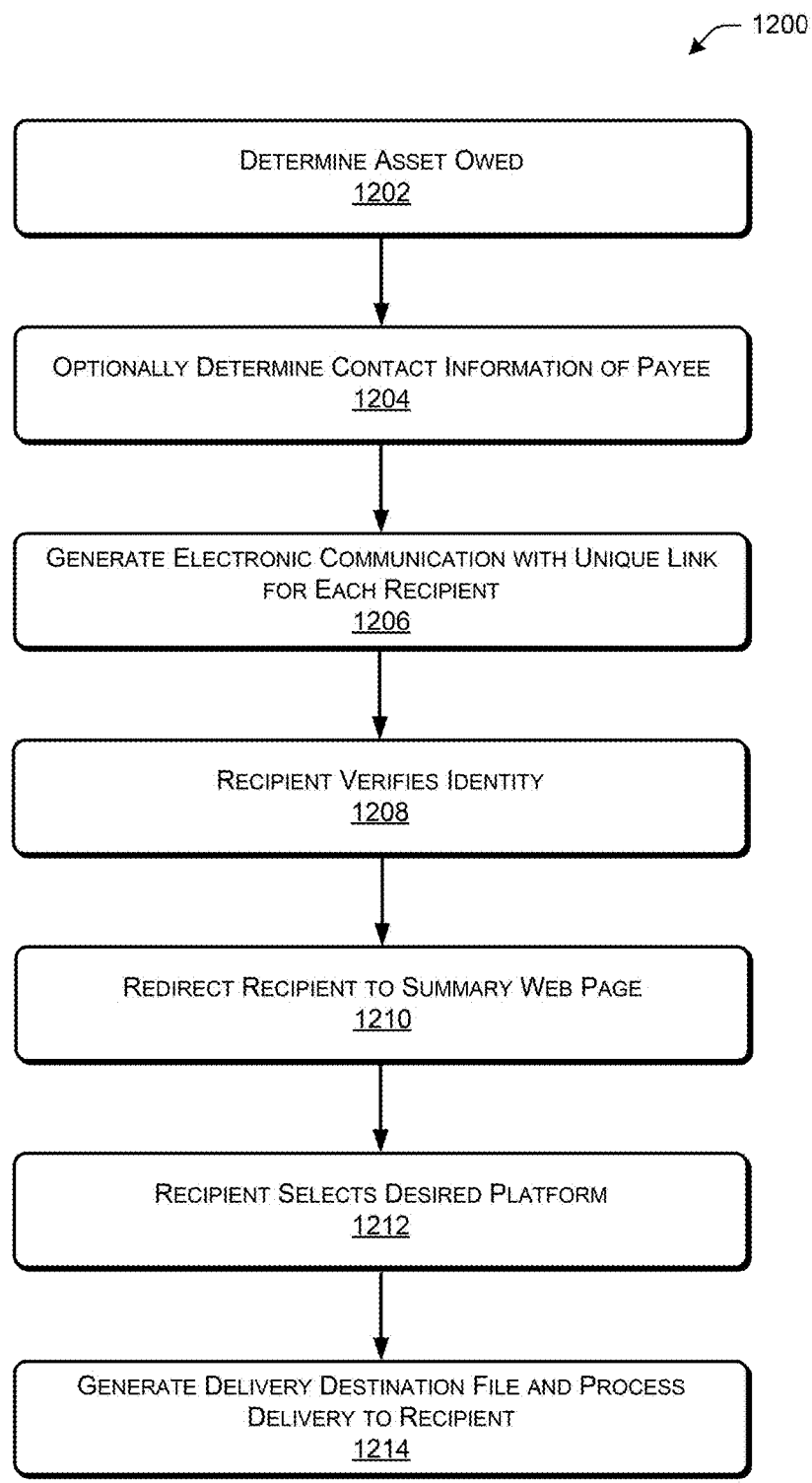
FIG. 12 illustrates a process for automating payment delivery to a payee, in accordance with some embodiments.

FIG. 12 illustrates an example process of determining an asset owed, contacting the owner, and initiating transfer of the asset. In some cases, the systems and methods described throughout the examples herein may be used for business to business (B2B) payments, and may also be used through email and more traditional payment options, such as, without limitation, ACH, WFT, Paper check, etc. At block 1202, the system may determine that an asset it owed. This may be a payment to a person or to a company that the sender owes. This step may also be in response to receiving an invoice or other notification that a payment is owed. In some cases, the system receives the invoice automatically, and in some cases, the details may be input into the system by a user through a human to computer interface device.

At block 1204, the system may determine the contact information of the payee. For instance, the system may determine one or more of a name, an address, banking details (e.g., bank name, routing number, account number), a due date for a payment, among other relevant information. For instance, where a payee identification is known, the system may determine, or receive an indication of a bank, and the system may determine a routing number for the bank.

At block 1206, the system generates an electronic communication with a unique link for each recipient. For example, the system may generate an electronic communication such as an e-mail message, a text link, a push notification, or some other form of electronic message that includes a unique link. The unique link may include a hypertext transfer protocol link (http) to a unique landing page generated specifically for the recipient. In some cases, there may be multiple recipients, and each individual message may be created to have a unique link for each recipient to an individual landing page on a web site. The system may automatically generate the landing page on a web site that includes additional information, such as, without limitation, the name of the recipient, a payment owed, a way to verify the identity of the recipient, among others. In some cases, an email communication may be sent directly to an accounts receivable department at a payee.

At block 1208, the recipient, at the individualized landing page, verifies their identity. This may be performed by, for example, entering an employer identification number (EIN), an invoice number, a PO number, a username and password, a code sent to a smartphone associated with the recipient, or some other method of verifying the identity of the payee.

At block 1210, the recipient may be redirected to another web page specific to the recipient that may show a summary page of the asset or payment owed to the recipient. It may include information associated with the sender, the recipient, an account number, an invoice number, a payment amount, a date when the payment became due, payment terms, among other information.

At block 1212, the recipient selects the desired platform through which payment should be made. This may include electronic platforms, such as automated clearinghouse (ACH), electronic funds transfer (EFT), PayPal, Zelle, or some other electronic platform. In addition, the platform may include a paper check which can be mailed to the recipient. The recipient may enter additional payment details, such as, for example, a bank account number, a bank routing number, a phone number associated with a Zelle or PayPal account, or other identifying information associated with accounts such as Apple Pay, Venmo, Google Pay, Amazon Pay, Afterpay, Visa, Klarna, and Meta, among others. It should be appreciated that payment accounts and platforms may be later developed and those later developed electronic payment platforms may be integrated into the systems described herein.

At block 1214, the system generates a payment destination file for the payment processor to move the money with. The payment destination file may include account details, such as account numbers, account identifiers, payment amount, the source of the funds, and the ultimate destination of the funds, among others. The payment destination file may then be sent to the electronica payment platform for executing and transfer of the payment from the source to the destination.

As with may of the disclosed embodiments herein, systems configured to carry out the disclosed methods and steps include a combination of specialized components tailored for efficient data processing and communication in order to generate and deliver one-to-many communications. A centralized server computing system can handle a large volume of data processing and simultaneous connections, such as through wired or wireless communications, and may be configured to send text messages over cellular networks. The centralized server computing system may have high-speed network interface cards to facilitate communication over the network, and may support technologies such as ethernet, infiniband, fiber channel, cellular, or other communication technologies.

A load balancer may be provided to distribute incoming and outgoing network traffic across multiple servers in the infrastructure and may include specialized ASICs or FPGAs to handle packet routing and load distribution efficiently. The system may include one or more database servers to store recipient information, message content, and other relevant data. In some cases, a specialized set of instructions can be used to enrich the data stored within the database, such as a module that is configured to search death records, employment records, residence information, and others.

To manage the distribution of the unique messages to each recipient, the system may incorporate messaging queue systems such as, without limitation, RabbitMQ, Apache Kafka, ActiveMQ, or some other suitable messaging queueing system. The system may further utilize dedicate encryption hardware such as cryptographic accelerators or hardware security modules (HSMs). These devices may be used to offload encryption and decryption operations from the main CPU, thus improving performance and enhancing security. In those cases in which the system is configured to generate unique electronic one-to-many communications to each potential recipient that may include personally identifiable information and/or financial information, security and discretion are important.

The centralized server computing system may be configured to send unique electronic communications via an SMS protocol in which text messages are sent to individual mobile telephones. The text messages may include an identification of the recipient, an identification of the property owed to the recipient, an identification of a third party that is holding the property, and a unique electronic hyperlink that allows a recipient to visit a secure and personalized web page that allows the recipient to verify their identity, and initiate a transfer of the property. In many cases, the property is financial in nature, and the transfer of the property may be conducted by an electronic transfer, which may include a peer-to-peer transfer system, an ACH deposit, or other form of electronic property transfer.

In this way, the system solves the historical issues with transferring property to numerous recipients, especially where the value of the property is small and there is little incentive for a property holder to transfer the property. Moreover, the systems and methods described herein improve the technology and technical field of distributing property to numerous recipients. As discussed above, a property holder may hold thousands or tens of thousands of items of property owed to as many recipients, and processing this volume of transfers is difficult, and in many cases, does not happen because of the volume of property transfers required, and also due to the cost of finding the property owners and transferring the property. The technology thus described automates much of the time, labor, and research required to find the property owners, generate unique communications to each of the property owners, create customized web page links to each of the property owners, create customed web pages for each of the property owners, verify the owner identity, and transfer the property, thus resulting in a technological solution that is far more efficient and improved over prior methods. While prior methods may allow a property holder to search public and private databases to discover a living status or a current job, this has historically been a time-intensive and manual process that involves a lot of computer research, computer queries, and human involvement to conduct the searches. The solutions proposed herein provide a far more efficient technological solution which utilizes a particular machine programmed in a particular way to enrich the dataset, interact with property owners to verify their identifies, and initiate property transfers.

By utilizing the systems and methods described herein, a payee data file that includes one or more payees can be received by the disclosed system. The payee data file may include identification of the payees and may further include cell phone numbers and payment amounts associated with each payee. The system may automatically generate communications with each of the payees in the payee data file, verify the identity of the individual payees, and then process electronic payments to the payees. The system functions largely automatically, thus reducing cost to the payor, increasing efficiency, and increasing the speed at which the payment reaches the payee.

According to embodiments described herein, a central processing server is responsible for receiving batch payment instructions from an authorized entity. The instructions may include detailed payment data for multiple recipients. Upon receipt, the central processing server performs initial validation and stores the instructions in a secure, relational database designed for high-throughput transaction processing.

The central processing server may generate a unique transaction record for each recipient in the batch. This may involve creating a unique token for each transaction using a cryptographic random number generator (RNG) to ensure uniqueness and security. The token, along with recipient identifiers and payment details, is stored in the transaction record within the database.

An interface server is configured to generate personalized electronic communications (emails, SMS messages, or in-app notifications) for each recipient. This process involves dynamically embedding the unique token into a secure hyperlink within the message content. The interface server may employ a template engine to customize the communication format and ensure consistency across different platforms.

When a recipient accesses the unique link, they are directed to a secure web portal hosted by the interface server or another secure server. The portal operates over HTTPS, ensuring encrypted communication between the recipient's device and the server. The portal retrieves the unique token from the URL and communicates with the central processing server to validate the token against the stored transaction records.

The system may include an authentication server or module that manages the recipient identity verification process. This server supports various authentication methods, such as passwords, security questions, uniquely identifying information, and biometric verification, among others. The chosen method may depend on the recipient's prior setup and preferences. The authentication server communicates securely with the web portal to confirm the recipient's identity before allowing access to payment details.

After successful identity verification, the recipient may be presented with a selection interface to choose their preferred electronic payment platform. The interface server retrieves available options from a configuration database and presents them to the recipient. Once a selection is made, the central processing server gathers the necessary details (such as bank account or digital wallet information) and initiates the payment process through integrated APIs with the chosen payment platform. The system uses secure API calls and follows industry-standard payment protocols (e.g., ISO 20022) to execute the payment.

The central processing server may update the transaction status in real-time. This involves logging each step of the payment process and sending confirmation notifications to both the payer and the recipient. The server uses a message queuing system to handle asynchronous updates and ensure reliable communication.

The disclosure sets forth example embodiments and, as such, is not intended to limit the scope of embodiments of the disclosure and the appended claims in any way. Embodiments have been described above with the aid of functional building blocks illustrating the implementation of specified components, functions, and relationships thereof. The boundaries of these functional building blocks have been arbitrarily defined herein for the convenience of the description. Alternate boundaries can be defined to the extent that the specified functions and relationships thereof are appropriately performed.

The processes described herein are illustrated as a collection of steps in a logical flow, which represent a sequence of operations that can be implemented in hardware, software, or a combination thereof. In the context of software, the steps represent computer-executable instructions stored on one or more computer-readable storage media that, when executed by one or more processors, perform the recited operations. Generally, computer-executable instructions include routines, modules, programs, objects, components, data structures, and the like that perform particular functions or implement particular data types. The order in which the operations are described is not intended to be construed as a limitation, and any number of the described blocks can be combined in any order and/or in parallel to implement the processes. Moreover, some of the operations can be repeated during the process.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments, but should be defined only in accordance with the following claims and their equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

Unless otherwise noted, the terms "connected to" and "coupled to" (and their derivatives), as used in the specification, are to be construed as permitting both direct and indirect (i.e., via other elements or components) connection. In addition, the terms "a" or "an," as used in the specification, are to be construed as meaning "at least one of." Finally, for ease of use, the terms "including" and "having" (and their derivatives), as used in the specification, are interchangeable with and have the same meaning as the word "comprising."

From the foregoing, and the accompanying drawings, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method, comprising:
   receiving, at a central server computing system, owner data associated with one or more property owners, the owner data including at least an identity of one of the one or more property owners and a property to be electronically delivered to individual ones of the one or more property owners;
   determining, by the central server computing system, and by querying a database from a third party, that one of the one or more property owners matches a customer data record associated with the third party, the customer data record comprises relationship-identifying information established during the relationship between the one of the one or more property owners and the third party;
   generating, by the central server computing system, an electronic communication to individual ones of the one or more property owners, the electronic communication including a unique electronic message for each of the one or more property owners including a unique hypertext transfer protocol link to an individualized landing page on a website and at least an identification of the property, information associated with the customer data record associated with the third party to increase a confidence of the individual ones of the one or more property owners of the unique electronic message, and instructions on how to receive the property, wherein the individualized landing page is automatically generated by the central server computing system;
   receiving an input by one of the one or more property owners at the individualized landing page displayed on a computing device associated with the one of the one or more property owners, the input including a text box on the individualized landing page for receiving one or more of an employer identification number, a social security number, an invoice number, a PO number, and a code sent to a smartphone associated with the one or more property owners;
   verifying, by using the input received from the one of the one or more property owners, an identity of the one of the one or more property owners; and
   delivering, after verifying the identity of the one or more property owners and through an electronic system, the property to the one of the one or more property owners.

2. The computer-implemented method of claim 1, wherein the property is a monetary payment.

3. The computer-implemented method of claim 1, wherein the communication to individual ones of the one or more property owners is sent as a push notification to an application installed on a device associated with individual ones of the one or more property owners.

4. The computer-implemented method of claim 1, further comprising determining a living status of the one or more property owners by automatically searching death records in locations associated with prior addresses of the one or more property owners.

5. The computer-implemented method of claim 1, further comprising determining, by the central server computing system, enriched owner data by automatically retrieving one or more of current contact information, employment information, and financial information associated with individual ones of the property owners.

6. The computer-implemented method of claim 1, wherein the unique electronic message is a notification sent through an application to a mobile communications device of the one or more property owners.

7. The computer-implemented method of claim 1, wherein the electronic message is a text message addressed to a cellular telephone number.

8. The computer-implemented method of claim 1, wherein the electronic message is an email message containing a unique web page link specific to each of the one or more property owners.

9. The computer-implemented method of claim 1, wherein the electronic communication comprises a value of the property and an identity of the third party holding the property.

10. The computer-implemented method of claim 1, wherein electronically delivering the property to the property owner comprises a funds transfer through a peer-to-peer transfer service.

11. The computer-implemented method of claim 1, wherein electronically delivering the property to the property owner comprises a funds transfer through a banking service.

12. The computer-implemented method of claim 11, wherein the banking service includes one or more of automated clearinghouse, electronic funds transfer, or Zelle.

13. The computer-implemented method of claim 1, wherein determining that one of the one or more property owners matches a customer data record comprises:
    matching at least two data points from the owner data with corresponding data points in the customer data record; and
    confirming that the matched customer data record shows an active or terminated relationship within a predetermined time period.

14. The computer-implemented method of claim 1, wherein verifying the identity further comprises:
    presenting multiple verification options on the individualized landing page, the individualized landing page displayed in a web browser on the computing device associated with the one of the one or more property owners;
    requiring successful verification through at least two different types of inputs selected from the employer identification number, the social security number, the invoice number, the PO number, and the code sent to the smartphone; and
    limiting the number of verification attempts to prevent brute force attacks.

15. The computer-implemented method of claim 1, wherein the individualized landing page displays:
    a portion of the information from the customer data record to confirm to the property owner that the third party has a legitimate relationship with them;
    an amount or description of the property to be delivered; and
    a secure form requiring the input before any property delivery options are displayed.

16. The computer-implemented method of claim 1, further comprising:
    generating an audit trail recording the inputs received and a time of verification;
    storing the audit trail; and
    preventing delivery if the inputs do not match expected values derived from the customer data record.

17. The computer-implemented method of claim 1, wherein the information associated with the customer data record that increases confidence comprises one or more of:
- a date range when the property owner had an active relationship with the third party;
- a geographic location associated with the relationship; and
- a category of services or products associated with the relationship.

18. The computer-implemented method of claim 1, further comprising providing a verification mechanism on the individualized landing page allowing the property owner to independently verify authenticity of the website through a third-party certificate authority or through contact information for the third party's verified customer service.

\* \* \* \* \*